United States Patent Office 3,352,287
Patented Nov. 14, 1967

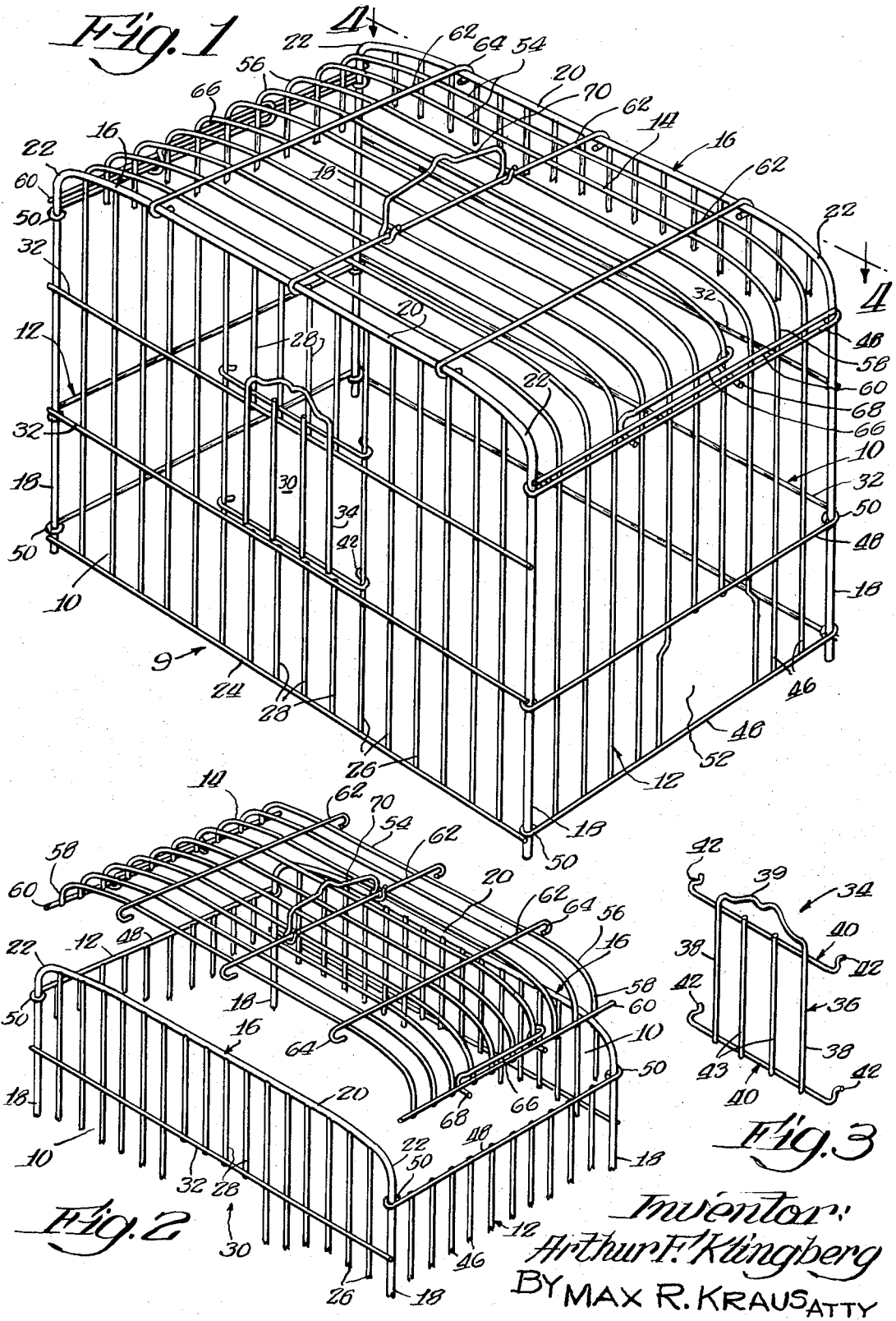

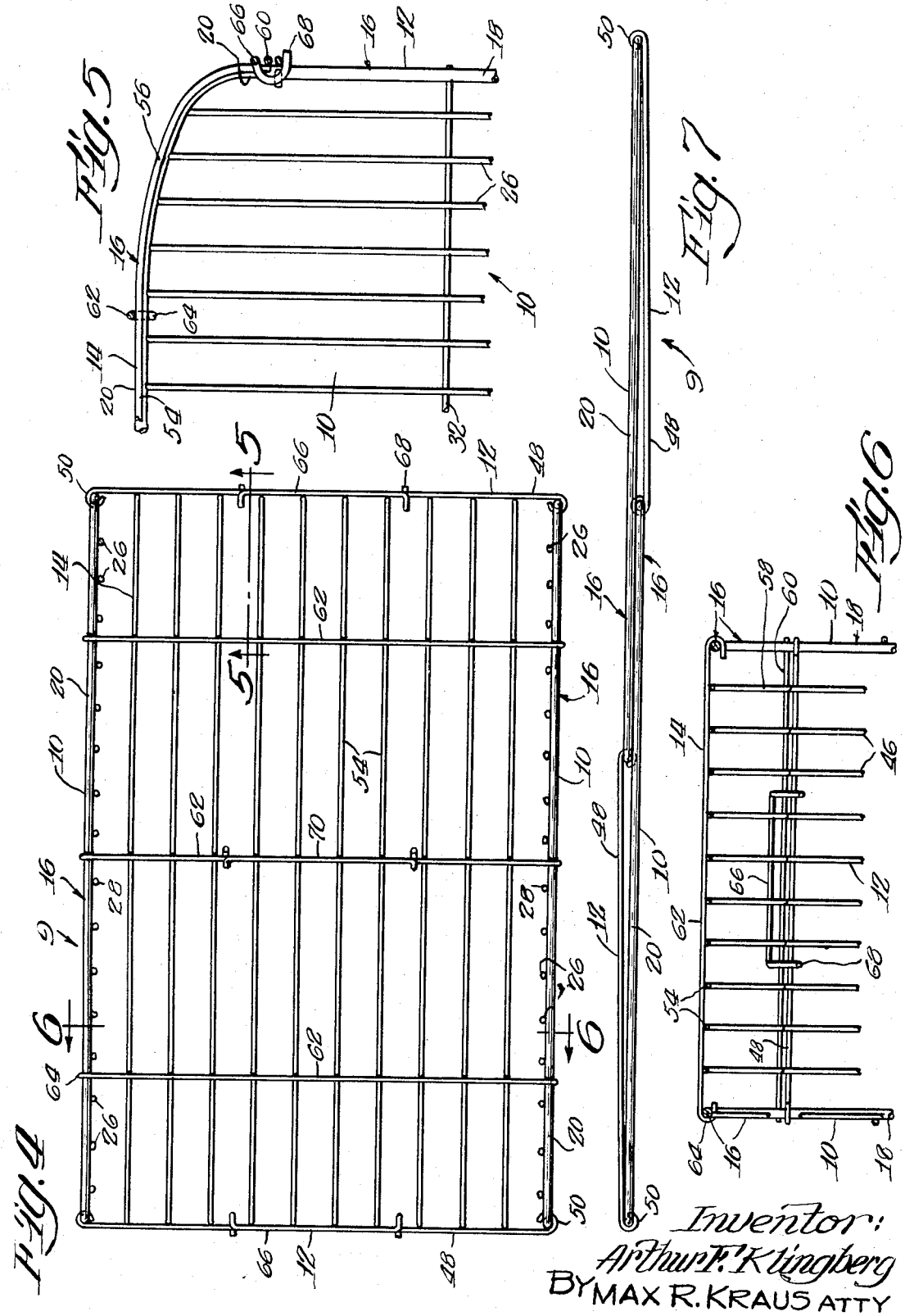

3,352,287
COLLAPSIBLE BIRD CAGE
Arthur F. Klingberg, McHenry, Ill., assignor to Beco Products Corporation, Chicago, Ill., a corporation of Illinois
Filed May 11, 1966, Ser. No. 549,271
5 Claims. (Cl. 119—17)

ABSTRACT OF THE DISCLOSURE

A collapsible bird cage having hingedly connected side and end walls forming the cage body with the top of the end walls terminating below the top of the side walls, a top for the cage body having hook means for detachably securing the top to the cage body, with the top having depending ends which occupy the space in the end walls above the top of the end walls. The attachment of the top to the cage body maintains the cage body in extended or setup condition. The cage body may be collapsed when the top is detached from the cage body.

---

This invention relates to a collapsible bird cage.

One of the objects of this invention is to provide a collapsible bird cage in which the cage body comprising the side and end walls are pivotally connected to permit collapsing of said side and end walls with respect to each other while same remain connected, and wherein a top member is detachably secured to said cage body, said top member serving to maintain the cage body in its extended set-up position.

One of the features of this invention is to provide a bird cage which may be packed and shipped in a collapsed condition and which may be readily set up and extended to its full bird cage position.

With this invention bird cages may be packed and shipped in cartons or boxes requiring a minimum of space, thus considerable economies are effected in the packaging and shipping, and may be readily set up for use by an inexperienced person, and when not in use requires less storage space.

Other objects will become apparent as this description progresses.

In the drawings:

FIG. 1 is a perspective view of the bird cage of this invention set up in its fully extended position.

FIG. 2 is a perspective view of the upper portion of the bird cage showing the roof or top portion thereof detached from the cage body.

FIG. 3 is a view of the gate member.

FIG. 4 is a top plan view taken on line 4—4 of FIG. 1.

FIG. 5 is a view taken on line 5—5 of FIG. 4.

FIG. 6 is a view taken on line 6—6 of FIG. 4, and

FIG. 7 is a view of the cage body in a collapsed position such as when same is packaged or stored to occupy a minimum of space.

The cage body generally indicated at 9 includes a pair of spaced side walls 10 and a pair of spaced end walls 12 which are pivotally or hingedly connected in a permanent manner to permit the cage body to be set up in a fully extended position, as shown in FIG. 1, to serve as a bird cage, or it may be collapsed, as shown in FIG. 7, wherein the side and end walls are moved adjacent each other to take up very little space.

The roof or top of the cage, generally indicated at 14, is detachably secured to side and end walls of the cage body 9 and when thus secured serves to support and hold the side and end walls in a fully extended or bird cage position. In shipping, the roof or top of said cage is positioned adjacent the cage body in its collapsed condition and occupies very little additional space. The same is true of the bottom which is a substantially flat member, so the parts when disassembled and in collapsed position may be contained in a container or shipping carton of a much smaller size than would ordinarily be required, and as a result effects a reduction in the cost of the carton and the shipping charges.

Each of the side walls has a continuous outer border wire member 16 which is of a generally inverted U-shaped configuration having spaced vertically extending side portions 18 connected by a horizontal top portion 20. The top of the side portion 18 where it merges with the opposite side portions is generally curved as at 22. A horizontally extending wire 24 extends between the side portions 18 adjacent the bottom thereof and is brazed or otherwise secured to the side portions 18. Secured as by brazing to said top portion 20 and bottom wire 24 of the side wall are a plurality of spaced vertically extending wires 26. Certain of the vertical wires, preferably adjacent the center, do not extend the entire height of the side wall but are shorter wires, as indicated at 28, to provide a space which forms a gate opening 30. The vertically extending wires 26 and 28 are also brazed to spaced horizontally extending wires 32, the opposite ends of which are brazed to the side portions 18. The outer border wire 16 is of a heavier gauge than the wires 26, 28 and 32.

A gate member 34, best shown in FIG. 3, is formed of a plurality of wires. Said gate is formed of an outer continuous wire 36 shaped to form spaced vertical sides 38 connected by a top wire 39 of a curved configuration. Spaced upper and lower horizontally extending wires 40 are brazed to the sides 38 and the opposite ends of the horizontally extending wires 40 are turned inwardly to form hook ends 42. Spaced vertical wires 43 are also brazed to the horizontal wires 40. As best shown in FIG. 1, the gate 34 is secured to the side wall 10 with the hooks 42 engaging the vertical wires 26 so that the gate can close the opening 30. The gate may be manually slid upwardly to uncover the opening. The opposite side wall 10 of the cage body is formed similarly to the side wall described, or it may be formed without the sliding gate 34.

The end walls 12 of the bird cage body are formed of spaced vertically extending wires 46 brazed to spaced horizontally extending wires 48. The opposite ends of the horizontally extending wires 48 are curled to form loops 50 which permanently engage the side portions 18 of the border wire 16. Thus, the end walls 12 are pivotally or hingedly permanently connected to the side walls 10 so that the side and end walls may be pivoted or moved from a collapsed position shown in FIG. 7 to an extended or set-up position shown in FIG. 1.

When the cage body is collapsed the side walls 10 are positioned adjacent the end walls 12, practically parallel to and in contact with each other. The cage body may be readily set up to its extended cage-like position, as shown in FIGS. 1 or 2, by manually pressing against the end walls. As shown in FIG. 1, one or both of the end walls 12 is provided with a gate opening 52 which is formed by shortening some of the vertical wires 46. The gate opening 52 may be closed by a slidable gate similar to gate 34 shown in FIG. 3.

The end walls 12 of the cage body do not extend the full height of the side walls 10 but terminate below the top plane thereof. The purpose of this is to accommodate the opposite ends of the roof or top 14 and to permit the roof or top to be detachably secured so as to support the cage body in its extended or set-up condition.

The top or roof 14 is formed of a plurality of spaced longitudinally extending wires 54, the opposite ends of which curve downwardly as at 56 below the plane of the top to form a depending end portion at each opposite end generally designated by the numeral 58. The ends of the wires 54 are brazed to transversely extending wires 60. The opposite ends of the transversely extending wires 60 extend beyond the sides of the top or roof to engage the side portions 18. Also extending transversely across the longitudinally extending wires 54 and brazed thereto are a plurality of spaced cross-wire 62, with the opposite ends of said wires curved downwardly to form hook ends 64. Hooking means are provided at the depending end portions 58 of the top or roof 14. Same may be formed of a wire 66 which extends parallel to the end wire 60 and which is brazed to the longitudinally extending wires 54, with the opposite ends curved to form hooks 68 extending outwardly beyond the bottom of wire 60. The outwardly extending hooks 68 are adapted to engage the top cross wire 48 of the end wall 12, with the hooks 64 engaging the top border wire 20 of the side walls. When the top or roof 14 is secured to the cage body the opposite depending end portions 58 of the top member extend below the top and into the ends of the cage body and when the top is hooked thereto it prevents the side and end walls from collapsing.

A wire bracket 70 is secured to the center cross wire 62 and same is secured to a hook on a supporting stand whereby the bird cage is suspended.

The bottom or base of the cage is not shown as it may be of any conventional form. It may comprise a plate which is detachably secured to the side and end walls adjacent the bottom of said walls.

It will be understood that various changes and modifications may be made from the foregoing without departing from the spirit and scope of the appended claims.

What is claimed is:

1. A collapsible bird cage comprising a cage body formed of a pair of spaced side walls and a pair of spaced end walls pivotally connected to permit collapsing of said cage body while the side and end walls remain connected, the top of the end walls terminating below the top of the side walls to provide a space between the top of the end walls and the top of the side walls, a detachable and removable top having its opposite ends depending below the plane of the top, said depending ends occupying the space above the top of the end walls of the cage body and terminating adjacent the top of the opposite end walls of the cage body, hook means between the cage body and the top for detachably hooking and supporting said top to said cage body, said top when hooked to said cage body supporting said top and maintaining said cage body in extended and set-up position, said depending portions extending for engagement of said hook means with said end walls, said top when detached from said cage body permitting said cage body to be collapsed.

2. A structure defined in claim 1 in which the top includes said hook means extending from the opposite sides for detachable engagement with the upper portion of the side walls.

3. A structure defined in claim 1 in which the top includes said hook means at its opposite ends for detachable engagement with the end walls of the cage body to detachably lock said top to said body.

4. A structure defined in claim 1 in which the top is formed of a plurality of spaced longitudinally extending wires and in which transversely extending wires are secured to said longitudinally extending wires with the transversely extending wires having said hook means at their opposite ends, which hook means are adapted to engage the spaced side walls of the cage body for detachably locking said top or roof to said cage body.

5. A structure defined in claim 1 in which the depending ends of the top have said hook means for attachment to the end walls of the cage body.

References Cited
UNITED STATES PATENTS

| | | | |
|---|---|---|---|
| 1,834,951 | 12/1931 | Jarvis | 220—6 |
| 2,010,121 | 8/1935 | Wesley | 220—6 |
| 2,789,531 | 4/1957 | Diefendorf | 119—17 |
| 2,864,335 | 12/1958 | Yellin | 119—17 |
| 3,146,773 | 9/1964 | Melzer | 220—6 X |

HUGH R. CHAMBLEE, *Primary Examiner.*